United States Patent [19]
Morimoto et al.

[11] Patent Number: 5,154,545
[45] Date of Patent: Oct. 13, 1992

[54] HIGH DENSITY PNEUMATIC TRANSPORT SYSTEM FOR USE IN POWDERED OR GRANULAR MATERIALS

[75] Inventors: Kiyoshi Morimoto, Mishima; Akikazu Iwamoto, Sunto; Masuo Moriyama, Numazu; Junji Nakagawa, Hirakata, all of Japan

[73] Assignees: Kyowa Hakko Kogyo Co., Ltd., Tokyo; Kabushiki Kaisha Matsui Seisakusho, Osaka, both of Japan

[21] Appl. No.: 445,669

[22] PCT Filed: Mar. 31, 1989

[86] PCT No.: PCT/JP89/00349
§ 371 Date: Dec. 1, 1989
§ 102(e) Date: Dec. 1, 1989

[87] PCT Pub. No.: WO89/09173
PCT Pub. Date: Oct. 5, 1989

[30] Foreign Application Priority Data

| Apr. 1, 1988 | [JP] | Japan | 63-81972 |
| Jun. 3, 1988 | [JP] | Japan | 63-138042 |
| Aug. 9, 1988 | [JP] | Japan | 63-199732 |

[51] Int. Cl.$^5$ .................. B65G 51/18; B65G 53/52
[52] U.S. Cl. .................. 406/191; 406/84; 406/195
[58] Field of Search .................. 406/83, 84, 144, 191, 406/195

[56] References Cited

U.S. PATENT DOCUMENTS

| 2,477,414 | 7/1949 | McBride | 406/195 |
| 3,503,650 | 3/1970 | Balmes | 406/195 |
| 4,904,127 | 2/1990 | Morimoto et al. | 406/84 |
| 4,904,128 | 2/1990 | Morimoto et al. | 406/195 |

FOREIGN PATENT DOCUMENTS

| 0670547 | 9/1963 | Canada | 406/195 |
| 0213623 | 10/1985 | Japan | 406/195 |
| 1414732 | 8/1988 | U.S.S.R. | 406/191 |

Primary Examiner—Joseph F. Peters, Jr.
Assistant Examiner—Linda L. Polomar
Attorney, Agent, or Firm—Koda and Androlia

[57] ABSTRACT

An improvement of a high density pneumatic transport system for pneumatically transporting powdered or granular materials placed in an airtight storage container to a collector through a transport pipe having a vertical riser pipe intermediately thereof by the use of pressurized gas. The transport pipe comprises a lower horizontal pipe being connected to the airtight storage container and having a convergent cylindrical accelerating reducer, an upper horizontal pipe being connected to the collector and having a divergent cylindrical decelerating reducer at its initial end, and a vertical riser pipe which connects the lower horizontal pipe to the upper horizontal pipe. The vertical riser pipe is provided at intermediate thereof up and down with an acceleration regulating reducer having a convergent accelerating portion above its bottom having a constricted portion and a divergent cylindrical decelerating reducer.

2 Claims, 5 Drawing Sheets

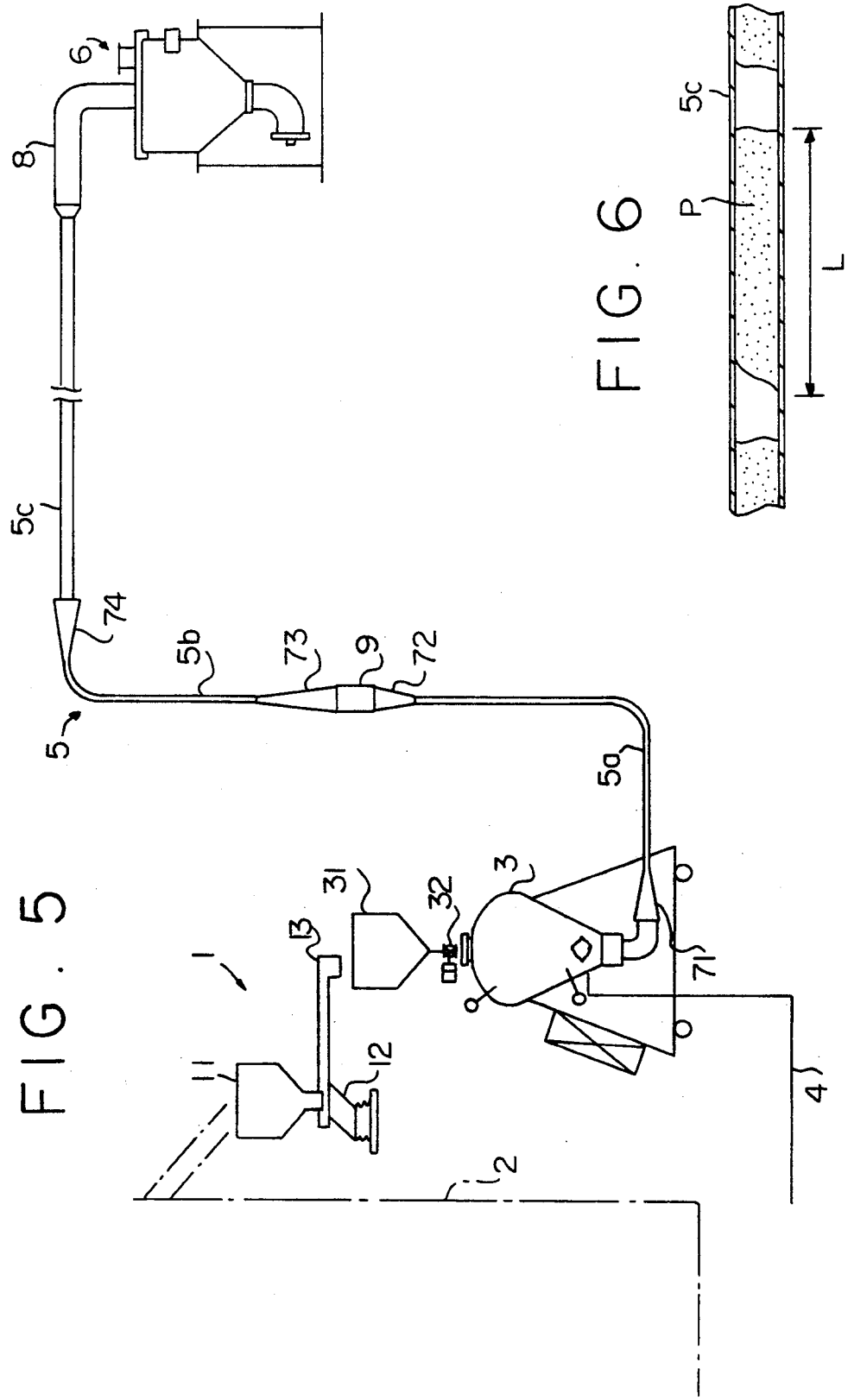

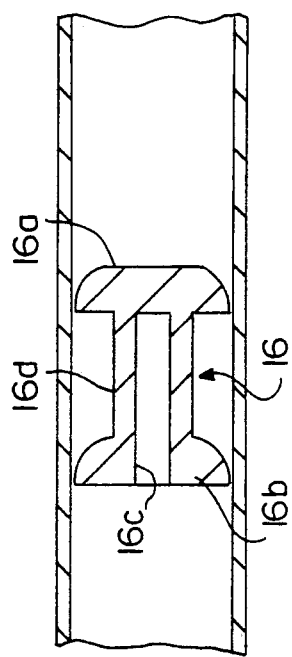
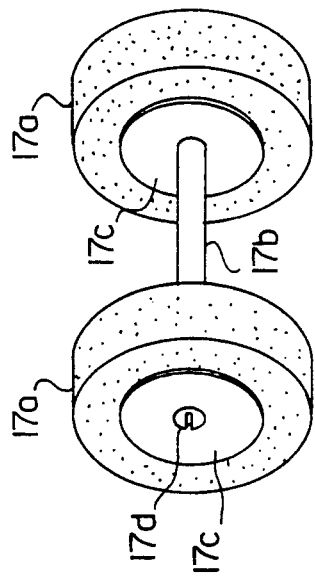
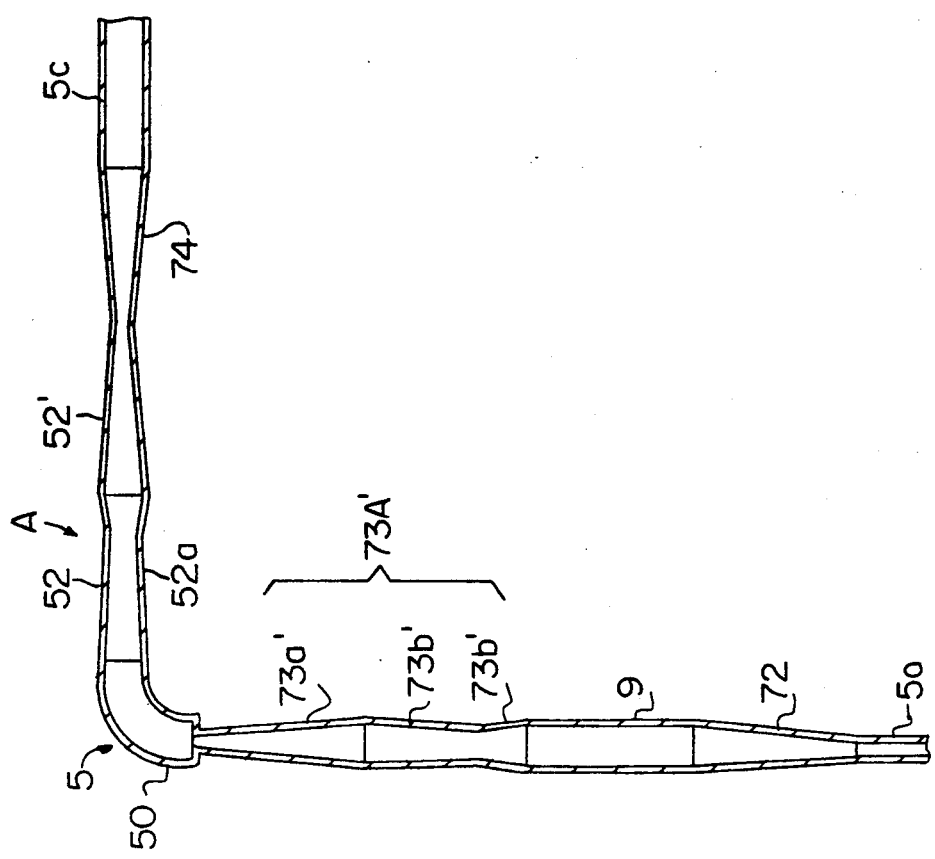

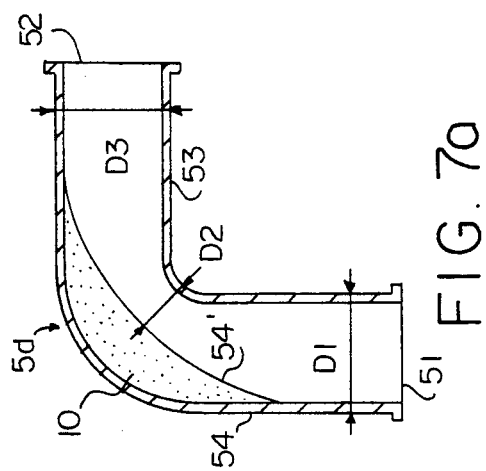
FIG. 7a
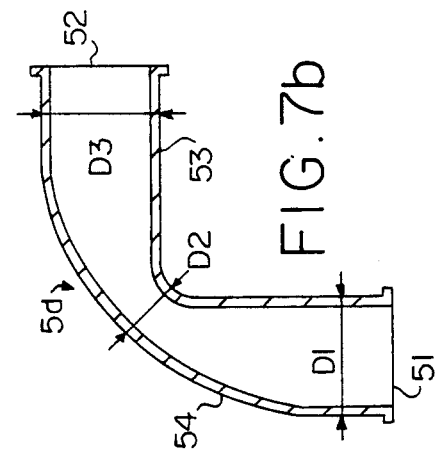
FIG. 7b
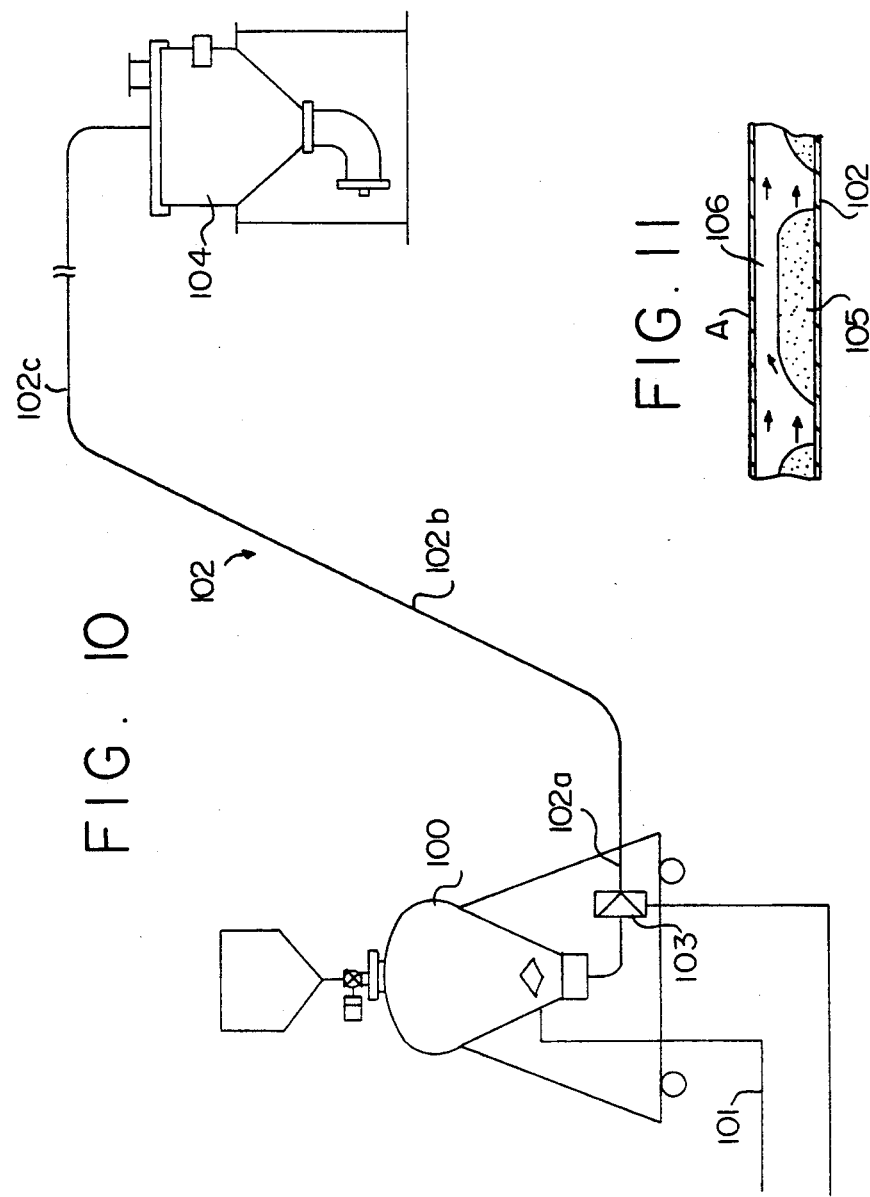
FIG. 10
FIG. 11

HIGH DENSITY PNEUMATIC TRANSPORT SYSTEM FOR USE IN POWDERED OR GRANULAR MATERIALS

BACKGROUND OF THE INVENTION

I. Field of the Invention

The present invention relates to a system for pneumatically transporting powdered or granular materials, more particularly to an improved system for pneumatically transporting powdered or granular materials stored in an airtight storage container to a collector through a transport pipe in high density and at low speed by supplying pressurized gas.

II. Prior Art

FIG. 10 shows a conventional pneumatic transport system for use in powdered or granular materials. The system is constructed such that powdered or granular materials stored in an airtight storage container 100 are fed from the container 100 to a lower pipe 102a of a transport pipe 102 by the gas supplied from a gas feed pipe 101, then the materials are formed into a a plug 105 by supplying pressurized gas intermittently from a pressure nozzle 103 disposed intermediate of the lower pipe 102a, and then pneumatically transported in an upper pipe 102c of the transport pipe 102 through an inclined pipe 102b, and finally received in a collector 104.

However, when powdered or granular materials are pneumatically transported in the form of a plug as described above, the clearance 106 between the surface of the plug 105 and the inner surface of transport pipe 102 is often generated as shown in FIG. 11. As a result, only powdered or granular materials A on the surface of the plug 105 are transferred at first and the shape of the plug 105 is broken, thus the transportation cannot be done satisfactorily. Furthermore, since the conventional transport system delivers the plug 105 at extremely high speed like several meters per second for example, the materials are subject to strong impact when being caught in the collector 104, and the collision of materials frequently occurs. Accordingly, there is a problem of high possibility of defective products having chipping or breakage when fragile materials such as medical tablets are pneumatically transported.

A method and the related system for pneumatically transporting powdered or granular materials without giving an impact thereon and at extremely low speed was disclosed in Japanese Patent Application No. 61-251173(1986) to solve above mentioned problems.

FIG. 5 shows a basic structure of the transport system according to the above mentioned application, wherein a transport pipe 5 being disposed between an airtight storage container 3 and a collector 6 comprises a lower horizontal pipe 5a having a convergent cylindrical accelerating reducer 71 connected to the airtight storage container 3, an upper horizontal pipe 5c being connected to the collector 6 and having a divergent cylindrical decelerating reducer 74 at its initial end, and a riser pipe 5b which connects the pipes 5a and 5c and has a pair of reducers consisted of an upper convergent cylindrical accelerating reducer 73 and a lower divergent cylindrical decelerating reducer 72 intermediately thereof.

According to such a pneumatic transport system, tablets delivered from a tablet molding machine 2 to a vibration feeder 1 fall into the container 3 passing through a hopper 31 and an opened valve 32. The tablets are transported from the container 3 to the lower horizontal pipe 5a by the use of pressurized gas supplied from a gas feed pipe 4, and immediately thereafter continuously transferred upwardly into the vertical riser pipe 5b being charged into a high density to a degree just before blocking the lower pipe 5a by the accelerating reducer 71. While transferring upwardly, the tablets are once decelerated by the reducer 72 being disposed midway of the vertical pipe 5b, and again accelerated by the reducer 73 while keeping the materials being charged at high density to obtain sufficient pushing force, subsequently transferred upwardly into the upper pipe 5c.

Immediately after the tablets are moved up to the upper horizontal pipe 5c and shifted the direction into a horizontal direction, they are once more decelerated by the reducer 74 being provided at the initial end of the upper pipe 5c. As a result, the tablets are formed into a long column P as shown in FIG. 6 to enable to be pneumatically transported at very low speed without producing any clearance between the upper pipe 5c. Therefore, unlike the conventional system, the tablets on the surface of the long column P are not transported at first to cause the breakage of the column P. Moreover, it is prevented that the tablets are broken by colliding with each other while transporting in the upper pipe 5c.

The column P is formed longer corresponding to the length of the upper pipe 5c. The experiment of the invention showed that a column length L was more than 1 (one) meter when the upper pipe 5c was 5 (five) meters long and a column length was more than 3 (three) meters when the pipe 5c was 20 (twenty) meters long. And it also showed that the speed of transportation could be reduced to about 0.1 meter per second. Therefore, the tablets which are transferred at low speed in the form of column in the upper pipe 5c are further decelerated by a large-caliber elbow 8 being disposed at the terminal end of the pipe 5c and received in the collector 6 under substantial gravitational fall, thus complete the pneumatic transport.

As the tablets are pneumatically transported at low speed and finally collected under substantial gravitational fall, they are virtually free from damage. Therefore, the previous invention has been an epoch-making one to enable to transport the materials at high density without cracking or breaking when transporting compression moldings such as confectionery and electric parts and powders or granules and other solids as well as tablets.

However, after further researches on the invention, it was found that according to the pneumatic transport system, it was necessary to control the pressure of transport gas when the tablets were different in grain sizes, the control operation was troublesome, and the tablets would not be formed into a long column uniformly without controlling sufficiently.

SUMMARY OF THE INVENTION

The present invention has been improved to solve the problems of previous application. The primary object is to provide a high density pneumatic transport system which makes it unnecessary to control the pressure of transport gas depending on the grain size of powdered or granular materials and can transport the materials in the form of long column uniformly.

The present invention propose to attain the above mentioned objects includes the following three related inventions.

A first invention relates to a system for pneumatically transporting powdered or granular materials stored in an airtight storage container to a collector through a transport pipe having a vertical riser pipe intermediately thereof, characterized in that the transport pipe comprises a lower horizontal pipe having a convergent cylindrical accelerating reducer and being connected to the airtight container, an upper horizontal pipe being connected to the collector and having a divergent cylindrical decelerating reducer at its initial end, a vertical riser pipe which connects the upper horizontal pipe to the lower horizontal pipe, and in that the vertical riser pipe includes an acceleration regulating reducer having a convergent accelerating portion above its bottom having a constricted portion and a divergent cylindrical decelerating reducer in such arrangement that said acceleration regulating reducer is disposed upward the divergent cylindrical decelerating reducer.

According to the first invention system, when powdered or granular materials stored in the airtight storage container are pneumatically transported at low speed through the transport pipe, the materials moving upwardly through the vertical riser pipe are decelerated by the decelerating reducer and are thereafter accelerated by the convergent accelerating portion of the acceleration regulating reducer. And at this time, the shortage of pushing force caused by the difference in grain size of the materials is adjusted in the constricted portion at the bottom of the acceleration regulating reducer, so that even if the materials are different in grain size, a long column can be successively formed without regulating the pressure of transport gas.

A second invention is an improved system of the first invention and is characterized in that the upper horizontal pipe and the vertical riser pipe are connected by a bend pipe having appropriate curved section or bend angle and in that the the bend pipe is formed in such manner that the central caliber thereof is smaller than those of other portions including the inlet and outlet thereof so that powdered or granular materials transferred from the vertical riser pipe are accelerated while moving upwardly from the inlet to the the center thereof and decelerated while moving upwardly from the center to the outlet and simultaneously the direction of materials is shifted from vertical to horizontal.

According to the system of the second invention, the bend pipe is formed as mentioned above, so that irregular formation of the materials into a column can be effectively prevented when the materials are transported upwardly in the vertical riser pipe and transferred into the upper horizontal pipe by shifting the direction to a horizontal direction.

A third invention is an another improvement of the first invention and is characterized in that the upper horizontal pipe and the vertical riser pipe are connected by a bend pipe having appropriate curved section and in that the bend pipe is connected to a divergent cylindrical deceleration reducer of the upper horizontal pipe via a regulating pipe including at least one supplementary reducer having a constricted portion.

According to the system of the third invention, the bend pipe and the divergent cylindrical reducer of the upper horizontal pipe are connected by at least one supplementary reducer having a constricted portion. Therefor, powdered or granular materials can be effectively prevented from turbulent movement and irregularity in the formation of a column by passing through the constricted portion of the supplementary reducer from the bend pipe.

BRIEF DESCRIPTION OF THE DRAWINGS

FIG. 5 is a diagram illustrating the transport system of the previous invention;

FIG. 6 is illustrates a column to be transferred;

FIGS. 7a and 7b are longitudinal sectional views showing one preferred embodiment of a bend pipe respectively;

FIG. 8 shows one preferred embodiment of the system according to the third invention;

FIG. 9(a-b) illustrates a transport plug;

FIG. 10 shows a basic construction of a conventional pneumatic transport system; and FIG. 11 illustrates a diagram of a conventional pneumatic transport system.

DETAILED DESCRIPTION OF THE INVENTION

The present invention will now be given by way of preferred embodiments.

Figure 1:
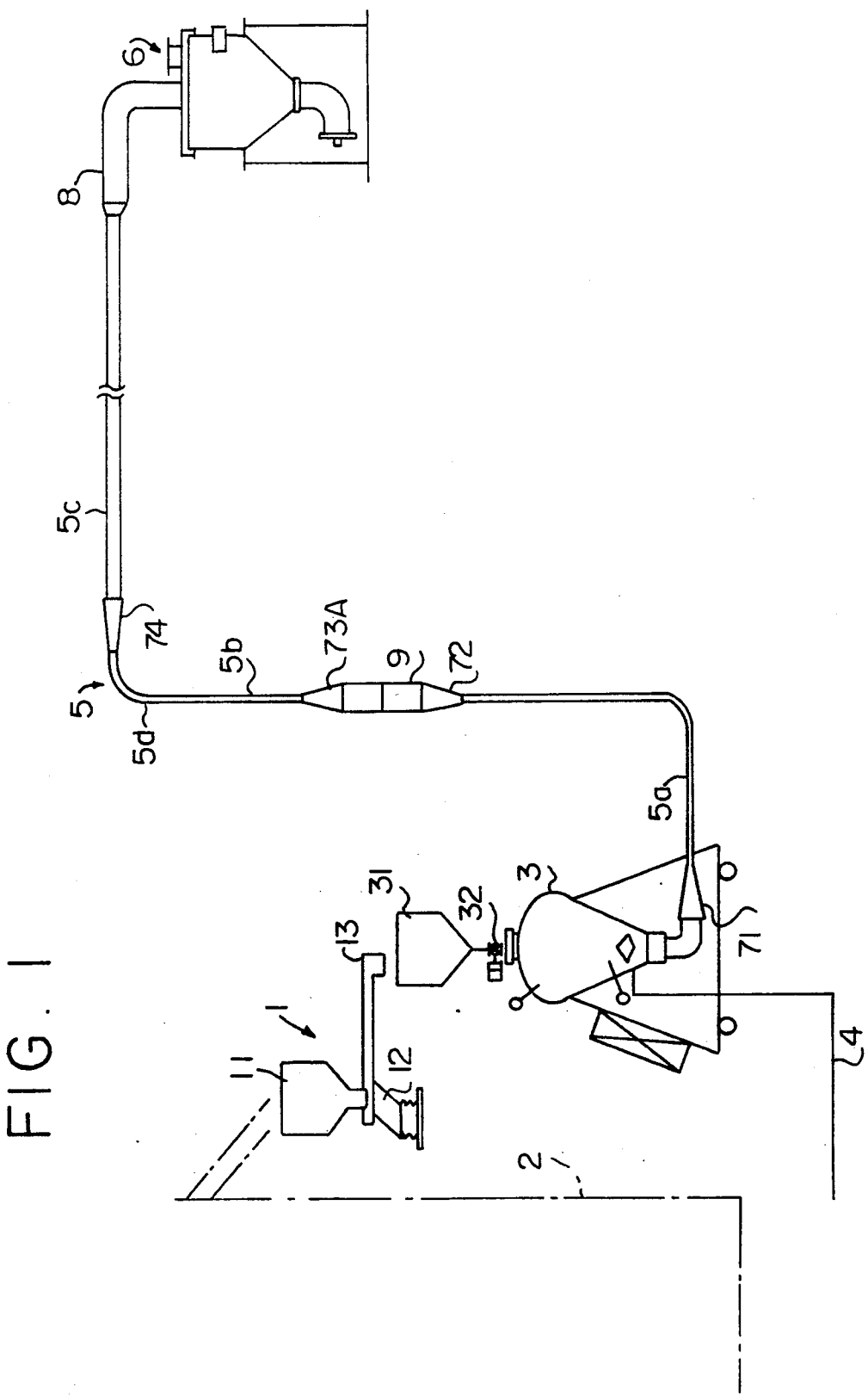
FIG. 1 is a diagram illustrating the construction of a high density pneumatic transport system for powdered or granular materials according to a preferred embodiment of the invention.

FIG. 1 shows a diagram of one preferred embodiment of the system according to the first invention, wherein pressurized air is used as a transport gas, and tablets are used as powdered or granular materials to be transported.

In FIG. 1, the numeral 1 designates a feeder, the tablets fed from a tablet molding machine 2 are stored in a hopper 11 of the feeder 1. The tablets are supplied to a hopper 31 of an airtight storage container 3 passing through a trough 13 by driving an electromagnetic vibrator 12 to give vibration to the trough 13.

A valve 32 is provided between the upper hopper 31 and the container 3. The tablets are fed into the container 3 by opening the valve 32. Open and close of the valve 32 and the electromagnetic vibrator 12 of the feeder 1 are controlled interlockingly in such a manner that the valve 32 is closed when the tablets in the container 3 are delivered into a transport pipe 5 and is opened when the tablets are fed from the feeder 1. Further, a gas feed pipe 4 is connected to the container 3 and the tablets placed in the container 3 are taken out to a lower horizontal pipe 5a of the transport pipe 5 by the pressure of compressed air supplied from the gas feed pipe 4.

The transport pipe 5 is constructed such that the lower horizontal pipe 5a being connected to an outlet at the lower end of the container 3 and an upper horizontal pipe 5c being connected to an enlarged elbow pipe 8 provided at an inlet of a collector 6 are connected by a vertical riser pipe 5b via a bend pipe 5d for shifting the moving direction of the material. And the lower pipe 5a is provided with a convergent cylindrical accelerating reducer 71 and the upper pipe 5c is provided with a divergent cylindrical decelerating reducer 74.

The vertical riser pipe 5b, which is one of the features of the system of the present invention, is provided up and down with an acceleration regulating reducer 73A, explained hereinafter and a decelerating reducer 72.

Figure 2:
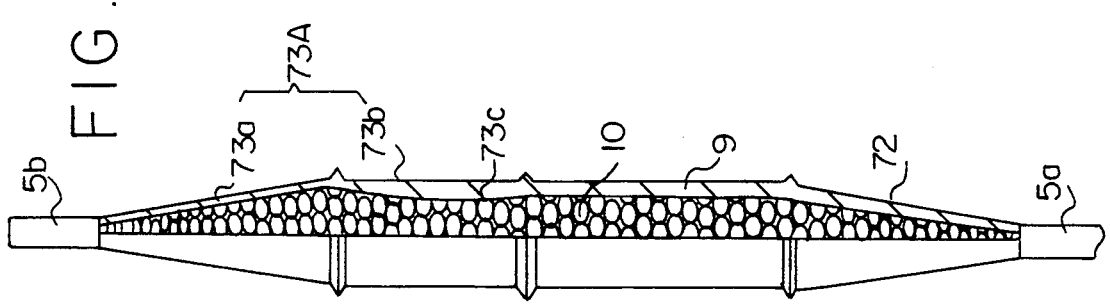
FIG. 2 is a partially cutaway vertical sectional view of an acceleration regulating reducer together with a decelerating reducer.

FIG. 2 shows a detailed construction of the acceleration regulating reducer 73A and the decelerating reducer 72.

The acceleration regulating reducer 73A is constructed such that a convergent accelerating portion 73a is formed above a cylindrical body 73b having a constricted portion 73c at its bottom and the reducer 73A is connected upward the decelerating reducer 72 as shown in FIG. 2. In the embodiment illustrated, the acceleration regulating reducer 73A comprises such that the accelerating reducer 73a is connected above the cylindrical body 73b having the constricted portion 73c at its bottom, but the reducer 73A may be formed integrally.

And a sight glass 9 for seeing through inside of the pipe is interposed between the acceleration regulating reducer 73A and the decelerating reducer 72, but the sight glass 9 of this kind is not always necessary.

Figure 3:
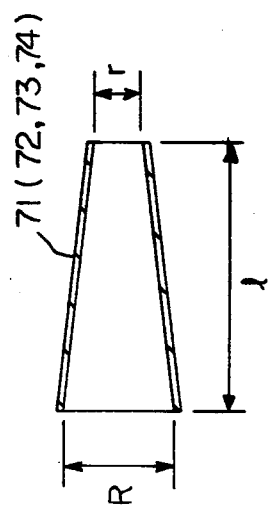
FIG. 3 is a diagrammatic illustration of a reducer used in an upper horizontal pipe and lower horizontal pipe.

The accelerating or decelerating reducer provided at the lower and the upper pipe of the present system is, as shown in FIG. 3, preferably set in such a size that a large open caliber R of the reducer is about 1.5 times as large as the small open caliber r and the length l of the reducer is about 4 to 20 times as long as the small open caliber r. In this embodiment, the reducers of which open caliber R are 37.5 mm, open diameter r are 25 mm, and length S are from 250 mm to 500 mm are employed.

According to the pneumatic transport system for powdered or granular materials of the present invention, the materials are pneumatically transported in the following manner.

Figure 4:
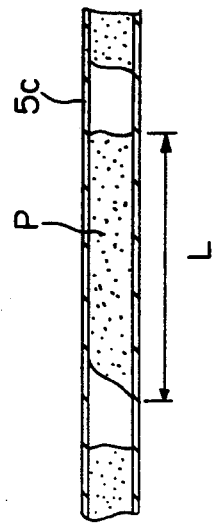
FIG. 4 illustrates a column to be transferred.

The tablets placed in the airtight container 3 are taken out of the container 3 to the lower horizontal pipe 5a by the use of the pressure of compressed air supplied from the gas feed pipe 4, and immediately thereafter transferred upwardly in the vertical riser pipe 5b being charged by the accelerating reducer 71 into a high density to a degree just before blocking. While transferring upwardly, the tablets are once decelerated by the reducer 72 to keep the tablets being charged at high density and again accelerated by the reducer 73A. Wherein, the tablets are accelerated by the convergent accelerating reducer 73a. The shortage of pushing force caused by the difference in the grain size of the tablets can be adjusted in the constricted portion 73c at the bottom of the acceleration regulating reduce 73A. Therefore, it is unnecessary to control the pressure of transport gas accurately each time the tablets of which grain sizes are different are transported. The tablets 10 are charged in the vertical riser pipe 5b as shown in FIG. 2 and move to the upper horizontal pipe 5c by being applied sufficient pushing force. Immediately after the tablets are moved up to the upper pipe 5c and changed their direction into a horizontal direction, they are once more decelerated by the reducer 74 being provided at the initial end of the upper pipe 5c. As a result, the tablets are formed into a long column P as shown in FIG. 4 and pneumatically transported at very low speed without producing any troublesome clearance in the upper pipe 5c. Therefore, the problem that tablets on the surface of the long column P is first transported to cause the breakage of the column P can be solved and the tablets are prevented from mutual collision and breakage inside the pipe 5c.

FIG. 7a shows a fragmental section of the system according to a second invention characterized by the construction of the bend pipe 5d.

The bend pipe 5d is provided between the vertical riser pipe 5b and the upper horizontal pipe 5c. A right-angled bend pipe which has the same caliber throughout the pipe is employed as the bend pipe 5d, as shown in FIG. 7a. By attaching a supplementary wall material 10 having a gently curved surface corresponding to the inside surface of the bend pipe 5d to the inner surface of an upper wall 54 of the bend pipe 5d, the distance between a lower wall 53 and an upper wall 54' (formed with the surface of the wall material 10) in the middle of the bend pipe 5d is formed shorter than the distance between those walls of the other parts including an inlet 51 and an outlet 52 and such construction enables a caliber D2 in the middle of the bend pipe 5d to be substantially smaller than calibers D1 and D3 of the other parts including the inlet 51 and the outlet 52. It is preferable that the supplementary wall material 10 is made of a shock-absorbing material so as not to give an impact on the tablets but the supplementary wall made of the same material as that of the bend pipe 5d may be attached directly to the inner surface of the bend pipe 5d instead of the shock-absorbing material.

According to the system of the invention having the bend pipe 5d constructed as described above, powdered or granular materials are transferred from the inlet 51 into the bend pipe 5d and the materials are flocculated and accelerated because the caliber of the pipe 5d is gradually narrowed from the inlet 51 to the middle of the pipe and thereafter the materials are dispersed and decelerated because the caliber of pipe 5d is gradually enlarged from the middle to the outlet 52. As a result, the materials can be transported upwardly in the bend pipe 5d being charged in high density and without generating any clearance in the pipe 5d.

FIG. 7b shows the bend pipe which functions in the same manner as that shown in FIG. 7a.

The bend pipe 5d is formed like a horn of which caliber D2 in the middle thereof is constructed so as to be smaller than the caliber D1 of the inlet 51 and the caliber D3 of the outlet 52. However, the shape of the caliber of the bend pipe 5d thus constructed is not limited to be a circle, but it may be employed the one having a smooth inner surface in different shape.

FIG. 8 shows the construction of the transport pipe which is the essential part of a third invention system. The transport pipe is constructed such that the upper horizontal pipe 5c and the vertical riser pipe 5a are connected by a normal bend pipe 50 having a suitable curved section or bend angle. And the transport pipe has a regulating pipe A which includes an supplementary reducer 52 having a constricted portion 52a which connects a divergent cylindrical decelerating reducer 74 of the upper pipe 5c and the bend pipe 50.

The regulating pipe A as illustrated is of the construction wherein the supplementary divergent reducer 52 having a constricted portion 52a is connected to an outlet of the bend pipe 50, another convergent reducer 52' having no constricted portion is connected to the rear end of the reducer 52, and then the rear end of the reducer 52' is connected to the inlet of divergent decelerating cylindrical reducer 74 provided at the initial end of the upper pipe 5c.

In FIG. 8, the upper end caliber of the accelerating portion 73a' of an acceleration regulating reducer 73A' is smaller than that of the inlet of the bend pipe 50.

According to such construction, in addition that the accelerated speed can be controlled at the constricted portion 73b' of the acceleration regulating reducer 73A, powdered or granular materials transported into the bend pipe 50 can be decelerated. In the experiment according to the present invention, it was showed that the materials could be effectively prevented from irregular movement. Further it was confirmed that the result could be achieved more effectively as the bent proportion of bend pipe 50 became larger.

A third invention is characterized in that a means for preventing the irregular movement of powdered or granular materials is provided between the outlet of bend pipe and the divergent cylindrical pipe connected to the initial end of the upper horizontal pipe. The object is to prevent the irregular formation of the materials into a column when the materials pass through the upper horizontal pipe.

According to the construction of the present system, the inside of bend pipe becomes larger than that of the second invention system, so that when residual materials in the transport pipe are removed by passing through a transport plug 16 and 17 as shown in FIGS. 9(a) and (b) after the transportation of the materials completes, the pipe will not be clogged with the residual materials. In addition to such advantages, replacement of powdered or granular materials will be efficiently carried out.

The transport plug shown in FIG. 9(a) is formed like a spool which has a mushroom-like head 16a and a bottom portion 16b of which are connected by a shank 16d and is made of a soft material such as a silicon rubber. And in the middle of its bottom 16b, a cavity 16c is formed to reach the shank 16d. While the transport plug shown in FIG. 9(b) is constructed such that a pair of disk-like plug portions 17a each having plain top and made of urethane are connected by a shaft 17b made of Teflon and each of two plug portions 17a is fixed with a set-bolt 17d so as to be clamped by a disk 17c made of Teflon respectively.

As is apparent from the above description, according to the first invention system, powdered or granular materials can be pneumatically transported safely at very low speed without doing troublesome regulation of the pressure of transport gas each time the tablets of which grain sizes are different are transported. And also it is possible to reduce the cost of whole system because expensive pressurizing nozzle apparatus for transportation which are indispensable to conventional system are unnecessary.

And according to the second invention system, especially the system having the bend pipe which is constructed such that the caliber in the middle thereof is formed smaller than those in the upper and lower portions thereof including the inlet and outlet, powdered or granular materials can be effectively prevented from the irregular formation into a column while moving upwardly in the bend pipe. As a result, further improvement can be made to reduce the possibility of damages of the materials.

Furthermore, according to the third invention system, diffusion and irregular movement of powdered or granular materials do not occur because of the speed controlling means being interposed between the outlet of the bend pipe and the initial end of the upper horizontal pipe. Therefore, a transport system for the materials which is more effective to prevent damage and segregation can be provided.

Industrial Utility

As mentioned above, the pneumatic transport system according to the present invention can pneumatically transport powdered or granular materials in the form of long column at low speed and at high density so that it can be preferably used to transport the goods which must be free from breakage and cracking such as confectionery and electric parts other than tablets or powders.

What is claimed is:

1. A high density pneumatic transport system for pneumatically transporting powdered or granular materials in a form of a long column at a low speed from an airtight storage container to a collector through a transport pipe having a vertical riser pipe interposed by an acceleration regulating reducer, wherein said acceleration regulating reducer comprises a convergent accelerating portion having a constricted portion at a bottom thereof and a divergent decelerating portion and said convergent accelerating portion is disposed on said divergent decelerating portion such that powdered or granular materials are gradually decelerated in said divergent decelerating portion and gradually accelerated in said convergent accelerating portion.

2. A high density pneumatic transport system according to claim 1, wherein said upper horizontal pipe and said vertical riser pipe are connected by a bend pipe having appropriate curved section and said bend pipe is connected to a divergent cylindrical deceleration reducer of said upper horizontal pipe via a regulating pipe including at least one supplementary reducer having a constricted portion.

* * * * *